United States Patent

Szerdahelyi et al.

[11] Patent Number: 5,836,651
[45] Date of Patent: Nov. 17, 1998

[54] ADJUSTABLE CROSS-DIVIDED BACKREST FOR VEHICLE SEAT

[75] Inventors: Ferenc Szerdahelyi, Coburg; Eberhard Pleiss, Untersiemau, both of Germany

[73] Assignee: Brose Fahrzeugteile GmbH & Co. KG, Coburg, Coburg, Germany

[21] Appl. No.: 930,737

[22] PCT Filed: Mar. 25, 1996

[86] PCT No.: PCT/DE96/00554

§ 371 Date: Sep. 30, 1997

§ 102(e) Date: Sep. 30, 1997

[87] PCT Pub. No.: WO96/30228

PCT Pub. Date: Oct. 3, 1996

[30] Foreign Application Priority Data

Mar. 31, 1995 [DE] Germany ................ 195 12 012.4

[51] Int. Cl.[6] ................................................. A47C 7/36
[52] U.S. Cl. ..................... 297/410; 297/408; 297/353; 297/284.1
[58] Field of Search ..................... 297/408, 410, 297/284.1, 353, 391, 362, 362.11, 354.12

[56] References Cited

U.S. PATENT DOCUMENTS

| 2,685,327 | 8/1954 | Pitman ................................... 155/158 |
| 4,626,028 | 12/1986 | Hatsutta et al. . |
| 5,037,158 | 8/1991 | Crawford . |
| 5,058,953 | 10/1991 | Takagi et al. . |
| 5,222,784 | 6/1993 | Hamelin . |
| 5,370,443 | 12/1994 | Maruyama . |

FOREIGN PATENT DOCUMENTS

| 353210 | 1/1990 | European Pat. Off. . |
| 1396937 | 5/1964 | France . |
| 2561182 | 9/1985 | France . |
| 3704489 | 8/1988 | Germany . |
| 3824730 | 1/1990 | Germany . |
| 9407773 | 9/1994 | Germany . |
| 672200 | 3/1994 | Japan . |
| 64044 | 6/1994 | Japan . |
| 1229947 | 4/1971 | United Kingdom . |
| 2201087 | 8/1988 | United Kingdom . |

*Primary Examiner*—Milton Nelson, Jr.
*Attorney, Agent, or Firm*—Christie, Parker & Hale, LLP

[57] ABSTRACT

An adjustable cross-divided backrest for a vehicle seat having of a lower backrest part which is mounted for swivel movement on a lower seat frame in an axis running across the travel direction, and an upper backrest part fixed so that it is displaceable on the lower backrest part, wherein the upper backrest part has an area supporting the head. The backrest is characterized in that the upper backrest part is both height adjustable and able to swivel relative to the lower backrest part, wherein the areas of the shoulder support and head rest are integrated in one piece in the upper backrest part. The lower backrest part has an upwardly directed projection in the area of the user's spinal column which can engage in a matching downwardly open recess of the upper backrest part. This projection of the lower backrest part substantially fills out the recess when the upper backrest part is located in its lowermost height adjustment position.

8 Claims, 3 Drawing Sheets

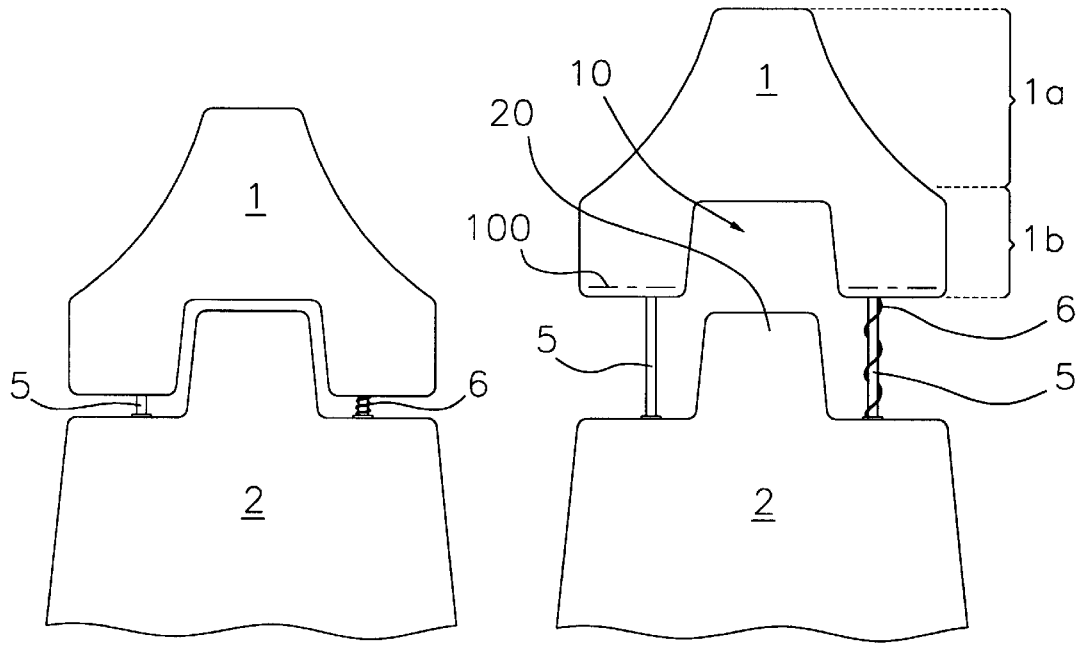
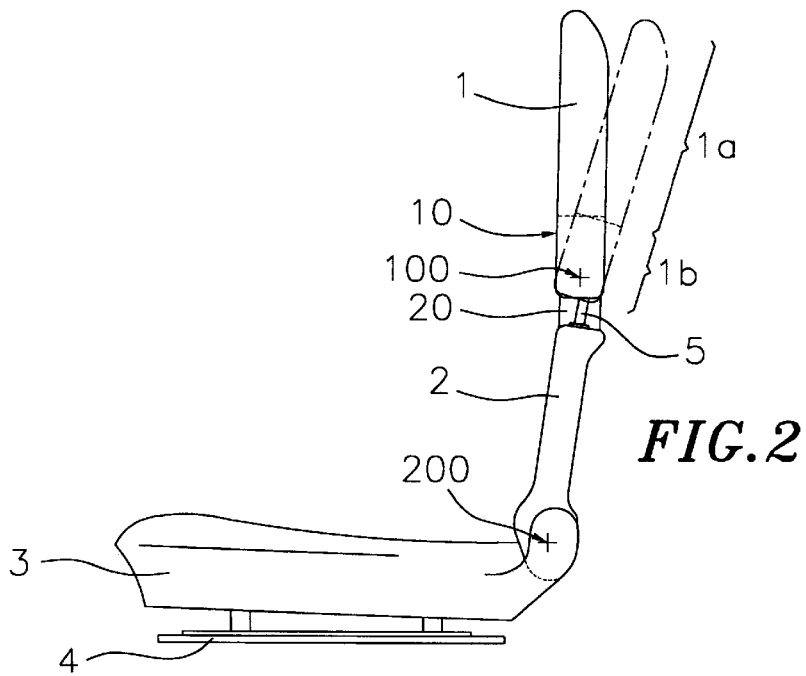
FIG.1a  FIG.1b
FIG.2

ADJUSTABLE CROSS-DIVIDED BACKREST FOR VEHICLE SEAT

BACKGROUND

The invention relates to an adjustable cross-divided backrest for a vehicle seat.

German Patent No. 23704489 C1 describes a vehicle seat having a lower backrest cushion section which is swivel mounted on the seat cushion and which is adjoined by a height-adjustable upper backrest cushion section. In each edge area there is a toothed rod which meshes with a locally fixed gearwheel of a drive and is covered by a folding bellows.

This vehicle seat allows the height of the backrest to be adapted to the size of the user, but as the backrest height increases, so does the gap between the lower and upper backrest cushion sections. Support of the user's spinal column in this area is thereby lost.

Japanese Patent No. A 6-72200 describes a vehicle seat whose backrest consists of an outer frame-like part and an inner part connected to an adjustable seat cushion wherein this part is also connected to the outer frame-like part through longitudinal guides arranged at the sides. As the seat cushion is moved forwards, the inner backrest part is dragged along. At the same time, a transversely aligned gap is thereby formed in the backrest which leads to reduced support for the spinal column. At the top end of the outer frame-like backrest part there are guides for holding a separate head rest.

Japanese Patent No. B2 6-4044 discloses a three-membered backrest for a vehicle seat which consists of a lower backrest part mounted on the lower seat frame and an upper backrest part whose swivel axis is set in the upper area of the lower backrest part. The swivel axis of the head rest is in turn mounted in the upper area of the upper backrest part. Each of the three backrest parts can be adjusted independently of the others so that—within certain limits— the shape and position of the backrest can be designed in practically any form. Since however no height adjustment of the backrest or of the backrest parts is possible it is not possible to adapt to the different body sizes of the various users.

A vehicle seat for work vehicles is described in German Patent No. A1 38 24 730. It consists of a rigid frame on which the upholstered seat elements are mounted so that they can tilt but cannot be displaced. The backrest, which as a result of the rigid frame cannot be swivelled as a whole, consists substantially of two parts: an upper backrest part, and a lower lumbar support which is fixed on the frame in a rotary bearing on the seat cushion side and is supported with its free upper end on the upper backrest part. The padded elements of the upper backrest part are fixed on a U-rail which is divided into a double-armed lever by a bearing adjoining the frame at the back. With a downwardly directed swivel movement of the upper backrest part the lower lever arm of the U-rail presses against the supporting lumbar support so that it undergoes a forward displacement.

Apart from the fact that the backrest cannot be swivelled as a whole there is no height adjustment. For users whose back length does not agree ideally with the rigid swivel axis of the upper backrest part, the seat described can lead to an ergonomically incorrect posture of the user.

French Patent No. A1 2 561 182 describes a vehicle seat which has a three-part backrest whose parts are vertically adjustable overall and relative to each other. A lower backrest part represents the lumbar vertebra support, the middle backrest part the shoulder support, and the upper backrest part represents the head rest. Swivelling the three support parts relative to each other is not possible.

The vehicle seat described above can be adapted so an individual user to some extent, but no means are provided which would allow a change of angular position between the upper and middle backrest part. Thus adapting the support curve of the backrest to different or changing needs is not possible. This can lead to premature fatigue of the user.

U.S. Pat. No. 2,685,327 describes a two-part backrest for a vehicle seat with a lower backrest part which is swivel mounted on a lower seat frame and an upper backrest part which has in the area of the user's spinal column a downwardly open recess in which the lower backrest part engages. The upper backrest part is fixed on the lower seat frame by a retaining plate and has displacement elements by means of which the lower backrest part can be swivelled.

This vehicle seat allows individual adaption of the central lower seat are to different persons, but does not allow any corresponding adaption of the seat areas which serve to support the user's head and shoulders.

SUMMARY OF THE INVENTION

According to one embodiment of the invention, an adjustable cross-divided backrest is provided for a vehicle seat which includes a lower backrest part having a projection and which is adapted to be mounted for swivel movement on a lower seat frame of the vehicle seat in an axis running across the travel direction of such vehicle seat. An upper backrest part including a head rest and a shoulder support, integrated in one piece, has a downwardly open recess in the area of the spinal column of a user of such vehicle seat. The upper backrest part is fixed to the lower backrest part wherein the upper backrest part is able to swivel and be vertically adjusted relative to the lower backrest part. The projection of the lower backrest part substantially fills out the recess of the upper backrest part when the upper backrest part is located in a lowermost adjustment position.

With an embodiment of the invention, a vehicle seat may be provided which offers great comfort through its good adaptability to the needs of the user. This is to be possible with a simultaneously simple construction of the backrest as well as easy adjustment.

The divided backrest according to another embodiment of the invention has a backrest part which is formed for both vertical adjustment and swivel movement relative to the lower backrest part and which integrates the areas of the shoulder support and head rest. The swivel axis lies in the area of the shoulder support of the upper backrest part, more particularly near the lower edge of the upper backrest part. The upper backrest part is hat-shaped and has a central downwardly open recess. In the lowest displacement position of the upper backrest part this recess is completely filled up by an upwardly aligned projection of the lower backrest part. The length of the projection should be selected so that it can also still serve as a spine support for a comparatively tall user. The position of the projection and the depth of the associated recess in the upper backrest part will preferably correspond to the maximum height adjustment path provided.

With an embodiment of the invention, it is possible to provide optimum adaption to different requirements for different users with only a two-part backrest whereby the simple adjustment improves not only the comfort but also the passive security of the seat. Consequently when adapting the vehicle seat to the body size of the user the integrated head rest area is automatically correctly adjusted. In the reverse case when first the head rest area of the upper backrest part is moved into the correct position the area of the shoulder support automatically occupies a calculated position which improves the seat comfort. In the lower area of the spinal column the lower backrest part offers adequate support.

A further preferred embodiment uses curved guide rods for the height adjustment of the upper backrest part. Thus when increasing the backrest height, the concave contour of the backrest is continued so that it ideally adapts to the substantially convex shaped contour of the back of the user.

A finally ideal incline adaption of the upper backrest part to the personal preference of the user is achieved by operating a manual or electrical swivel drive. The low-placed swivel axis prevents a ledge from forming between the upper edge of the lower seat part and the lower edge of the upper seat part when swivelling into extreme positions, as is the case with some of the known backrest adjustments.

A particularly advantageous embodiment of the invention consists in a modular structure of the backrest which combines all the adjustment mechanisms above the seat cushion in a unit which is pre-checkable prior to completing assembly of the vehicle seat. For this a separate frame is provided which has on the one hand the upwardly projecting continuation of the lower backrest part and on the other hand can be mounted on the bars of the lower backrest part. This separate frame furthermore supports the guide means (e.g., guide rods) of the height adjustment as well as the associated drive which can be formed for example as a toothed rod or spindle drive. The ends of the guide rods projecting over the frame are connected to the frame of the upper backrest part which supports the adjustment mechanism of the swivel drive.

A backrest of this kind allows a more efficient production of the seat frame since the seat variations can be produced more cost-effectively.

BRIEF DESCRIPTION OF THE DRAWINGS

The invention will now be described in more detail with reference to an embodiment and the illustrated drawings in which:

FIG. 1a is a diagrammatic illustration of the backrest according to one embodiment of the invention wherein the upper backrest part is located near the lowest displacement position;

FIG. 1b is a view similar to FIG. 1a with the upper backrest located in the uppermost displacement position;

FIG. 2 is a side view of a vehicle seat according to one embodiment with an upper backrest part shown in two swivel positions;

DETAILED DESCRIPTION

Figure 3A:
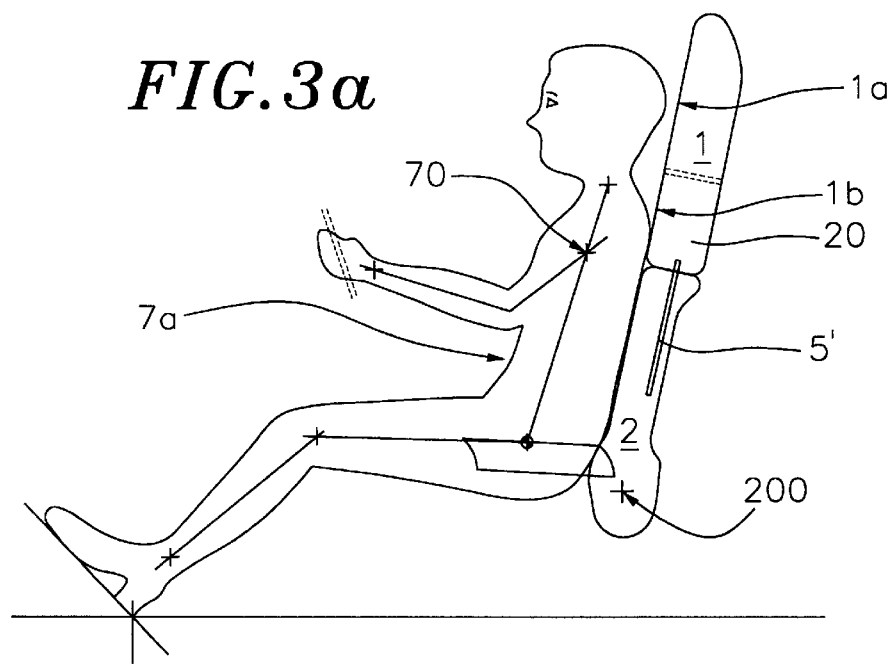
FIG. 3a shows a backrest setting for a comparatively short person.

According to one embodiment of the invention, the backrest is divided cross-wise underneath a shoulder area so that both a head rest area 1a and a shoulder support area 1b are a component part of an upper backrest part 1 wherein the upper backrest part is formed for height adjustment and swivel movement.

The embodiment illustrated in FIGS. 1a and 1b shows diagrammatically a backrest having an upper backrest part 1 which may be positioned in or between lower and upper height adjustment positions shown in FIGS. 1a and 1b, respectively. The transverse division of the backrest is not a substantially straight line separation but rather is such that a projection 20 into the region of the upper backrest part 1 is formed centrally on a lower backrest part 2. The projection 20 serves as an extended spinal column support. The lower edge of the upper backrest part includes a recess 10 to accommodate the projection 20. The outer sections in the lower area 1b of the upper backrest part 1 thereby serve to support the shoulders of a user. The section 1a adjoining at the top corresponds to the head rest.

The two backrest parts 1, 2 are connected together by two displaceably mounted guide rods 5. The drive of the height adjustment is set in the lower backrest part 2 whereas a drive 11 (See FIG. 4) of the swivel adjustment, which is supplied with energy through an electric cable 6, is set in the upper backrest part 1. The cable 6 may be wound around one of the, preferably tubular, guide rods 5 as shown in FIGS. 1a and 1b, or alternatively, the cable 6 can be concealed by routing it through the hollowed out area of a tubular guide rod 5. A swivel axis 100 of the upper backrest part 1 preferably lies close to the lower edge of the upper backrest part.

The side view of the vehicle seat according to FIG. 2 shows the upper backrest 1 in a central position of its range of adjustable height wherein the projection 20 of the lower backrest part extends partially in the recess 10 of the upper backrest part 1. A further back swivel position executed about a swivel axis 100 is shown in phantom. The lower backrest part 2 is mounted about a swivel axis 200 for articulation on the lower frame of a seat cushion 3. The vehicle seat is connected to the floor in a guide rail 4 so that it is longitudinally displaceable along the floor of the vehicle.

Figure 3B:
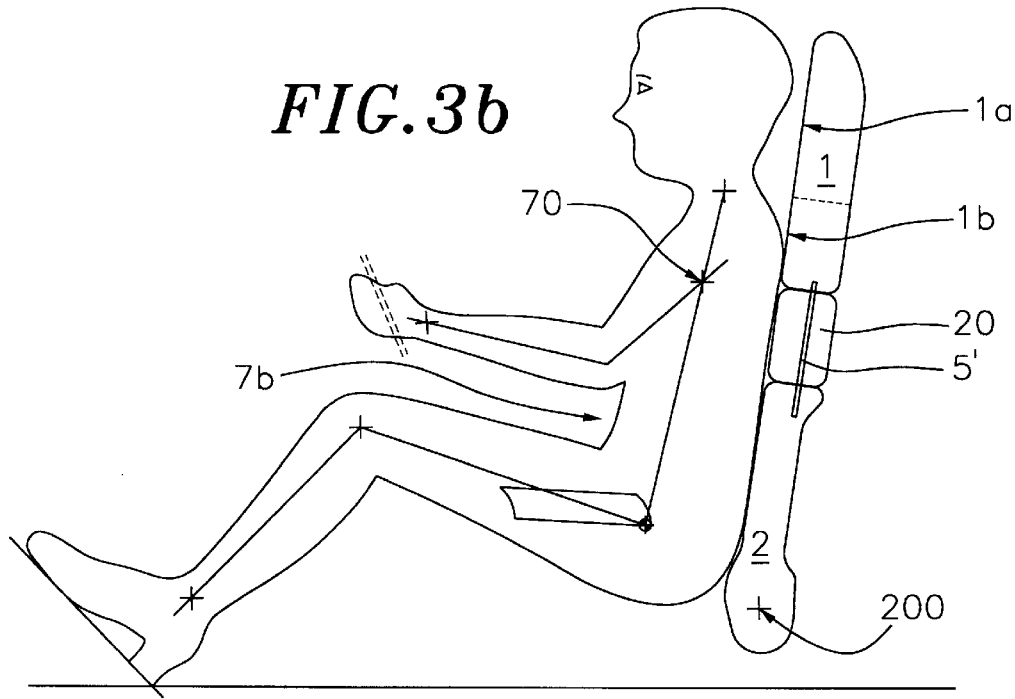
FIG. 3b shows a backrest setting for a comparatively tall person.

From FIGS. 3a and 3b it is easy to see the advantage of the simple adjustment of the backrest according to the invention. Since the area 1b of the upper backrest part 1 is always allotted to the shoulder area (shoulder joint 70) of a user, illustrated as either a relatively short user 7a and relatively tall user 7b, it can also be specially adapted to its support function. The adjustment of the upper backrest part 1 thus ensures the correct positioning of both the shoulder support area 1b and the head rest area 1a for the particular user. At the same time, the projection 20 on the lower backrest part 2 ensures good support for the spinal column even for the relatively tall user 7b.

A further adaption of the backrest to the individual needs of the user 7a, 7b can be provided by swivel movements of the upper backrest part 1 as already described in connection with FIG. 2. A swivel movement about the axis 200 includes the entire backrest body.

By using curved guide rods 5', it is possible to automatically to trigger a movement similar to a swivel movement which follows substantially the convex contour of the back of the user 7a,7b when adjusting the height of the upper backrest part 1.

Figure 4:
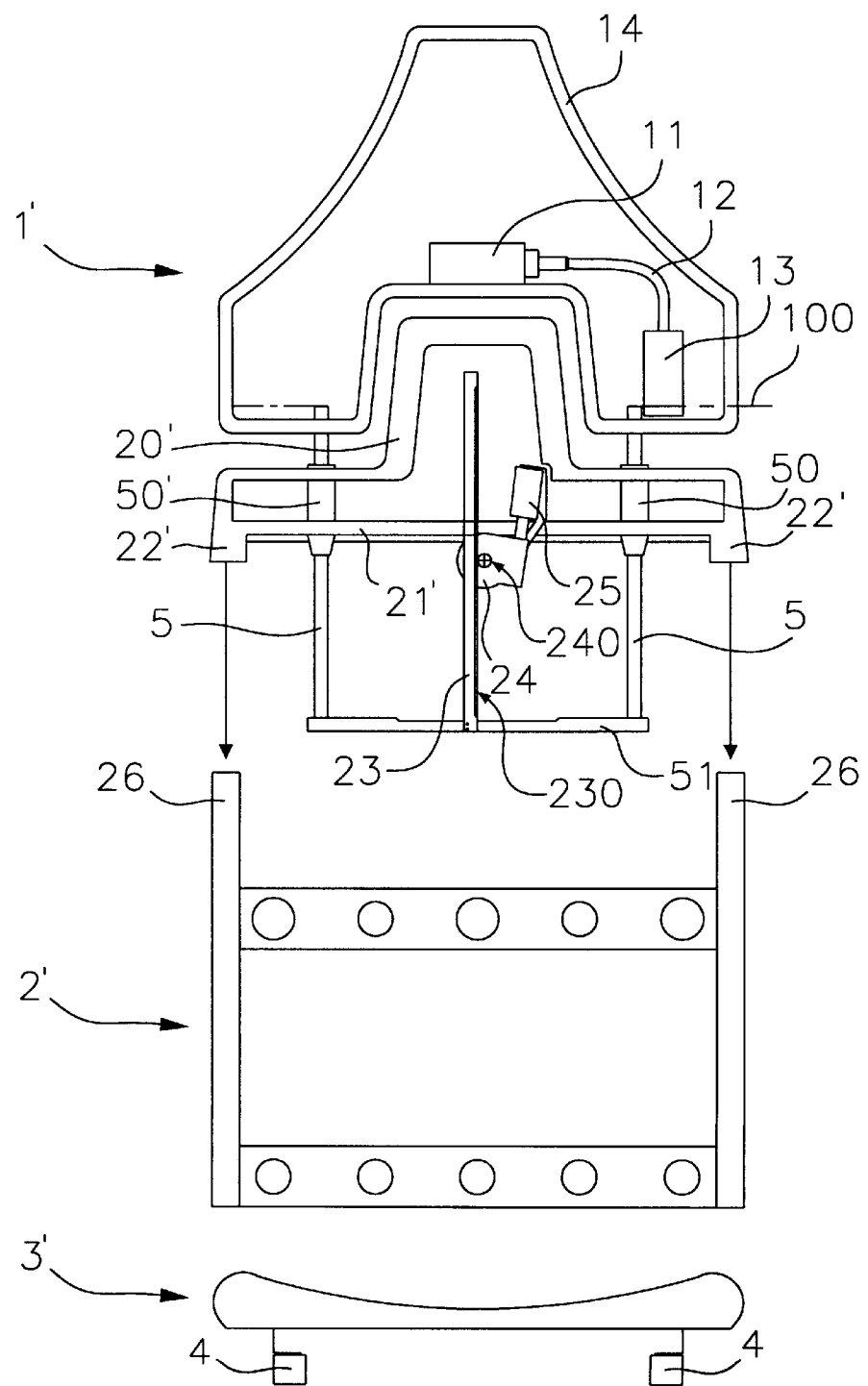
FIG. 4 is a front view of the non-padded frame assembly groups of the vehicle seat.

A particularly advantageous embodiment of the invention is shown in FIG. 4. The vehicle seat is divided into three main groups: a lower seat frame 3', a frame 2' to be mounted for swivel movement thereon and which is a component part of the lower backrest frame 2, and a function module 1' which, in addition to a frame 14 of the upper backrest part 1 and frame parts 20', 21', 22' of the head area of the upper backrest part 2, also integrates drive units 11, 12, 13 for swivel adjustment and drive units 24, 240, 25 for height adjustment. A modular, pre-checkable function unit is thereby produced which after its connection to free ends 26 of the vertical bars of the frame part 2' produces a complete backrest frame. Furthermore this modular technology allows variations to be quickly and cost-effectively adapted to customer requirements, for example the use of manual or electric adjustment fittings.

The function module 1' has a frame section 20' which provides the shape of the upper contour of the lower backrest part 2 with the projection 20. The side frame sections 22' serve to connect the function module 1' to the frame 2' of the lower backrest part 2. A cross bar 21' connects the frame sections 22' together and provides the design with the stability which is necessary for supporting the upper backrest part 1 and the drive parts 23, 24, 25 as well as for transferring the displacement forces.

In the illustrated embodiment, the cross bar 21' supports a drive unit comprising a motor 25 and gearing 24 with pinion 240. This pinion 240 meshes with the teeth 230 of a gear rod 23 which is aligned in the displacement direction of the upper backrest part 1 and is connected by a cross bar 51 fixed on the lower ends of the guide rods 5. The frame sections 20', 21' support guide sleeves 50 in which the guide rods 5 are displaceably mounted. A further variation suitable for adjusting the height of the backrest part 1 can be a spindle drive.

To carry out a swivel movement of the upper backrest part 1 about the axis 100, motor 11 is provided whose drive energy is directed into the gearing 13 via the flexible shaft 12. In the case of a manual drive instead of the electric motor 11, a hand wheel can be positioned at a suitable place.

We claim:

1. An adjustable cross-divided backrest for a vehicle seat, comprising a lower backrest part including a projection and which is adapted to be mounted for swivel movement on a lower seat frame of such vehicle seat in an axis running across the travel direction of such vehicle seat;

an upper backrest part including a head rest and a shoulder support integrated in one piece and which has in a central portion, a downwardly open recess, wherein the upper backrest part is fixed to the lower backrest part and is adapted to, swivel and be vertically adjusted relative to the lower backrest part, and wherein the projection of the lower backrest part substantially fills out the recess of the upper backrest part when the upper backrest part is located in a lowermost adjustment position.

2. A backrest according to claim 1 wherein the length of the projection of the lower backrest part and the depth of the recess of the upper backrest part each correspond approximately to a maximum height adjustment path of the upper backrest part.

3. A backrest according to claim 1 wherein adjacent the shoulder support of the upper backrest part is a swivel axis which is connected to means for executing a swivel movement.

4. A backrest according to claim 1 wherein the upper backrest part and the lower backrest part are connected together by two guide rods and wherein the lower backrest part includes drive means and guide means for the vertical adjustment of the upper backrest part.

5. A backrest according to claim 3 wherein the guide rods are curved so that the upper backrest part during its adjustment carries out a swivel movement about an imaginary center point.

6. A backrest according to claim 1 wherein a part of the backrest is constructed in the form of a pre-checkable function module which has a frame which can be mounted separately and closes the lower backrest part at a top portion, the part including drive means, guide means and at least one guide rod guided therein for height adjustment of the upper backrest part as well as a frame of the upper backrest part with associated drive means for swiveling the upper backrest part.

7. A backrest according to claim 6 further comprising a cross bar in the lower backrest part and wherein the drive means for height adjustment comprises a toothed rod gear wherein the toothed rod is fixed to the guide rods by the cross bar and during a displacement movement for height adjustment projects into an inner area of the projection of the lower backrest part, and wherein the drive means further comprises a motor-gear unit mounted on the frame.

8. A backrest according to claim 6 wherein the drive means for the height adjustment comprises a spindle gearing comprising at least one spindle in fixed connection with the guide rods and driven by a motor gear unit fixed on the frame.

* * * * *